(12) United States Patent
Srivastava et al.

(10) Patent No.: US 11,948,447 B2
(45) Date of Patent: *Apr. 2, 2024

(54) SMART CITIES MAP-BASED ALERT VISUALIZATION

(71) Applicant: Honeywell International Inc., Charlotte, NC (US)

(72) Inventors: Anushka Srivastava, Bangalore (IN); Vivek Ramachandran, Bangalore (IN); Chandrakantha Reddy, Bangalore (IN); Debasis Dash, Hadapsar (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,336

(22) Filed: Jul. 13, 2022

(65) Prior Publication Data

US 2022/0351605 A1 Nov. 3, 2022

Related U.S. Application Data

(63) Continuation of application No. 17/215,790, filed on Mar. 29, 2021, now Pat. No. 11,410,533.

(51) Int. Cl.
*G08B 25/00* (2006.01)
*G06F 16/29* (2019.01)
(Continued)

(52) U.S. Cl.
CPC ........... *G08B 25/006* (2013.01); *G06F 16/29* (2019.01); *G06Q 50/26* (2013.01); *H04N 7/181* (2013.01)

(58) Field of Classification Search
CPC ............... G08B 25/00–14; G08B 5/36; G08B 13/19682; G06F 16/29; G06F 3/04817; G06F 3/0482; G06F 3/0484; G06F 3/04842; G06Q 50/26; G06Q 10/00; G06Q 10/06; G06Q 10/10; H04N 7/181
See application file for complete search history.

(56) References Cited

U.S. PATENT DOCUMENTS

| 8,730,040 | B2 | 5/2014 | Donovan et al. |
| 9,355,540 | B2 | 5/2016 | Zajac et al. |

(Continued)

OTHER PUBLICATIONS

Hitachi Solutions Geographical Information System, 7 pages, https://www.hitachi-solutions.com/gis/ Accessed on Mar. 29, 2021.
(Continued)

*Primary Examiner* — Orlando Bousono
(74) *Attorney, Agent, or Firm* — Seager, Tufte & Wickhem, LLP

(57) ABSTRACT

A server generates and displays a map of a geographic region that includes a map representation of the geographic region and a plurality of asset icons each positioned at a location on the map representation that corresponds to a physical location of the corresponding asset in the geographic region. The map includes one or more alert icons each corresponding to an active alert generated by one of the plurality of assets in the geographic region. At least some of the one or more alert icons visually identify an alert type of the corresponding active alert and at least some of the one or more alert icons visually identify a priority level of the corresponding active alert.

20 Claims, 14 Drawing Sheets

(51) Int. Cl.
  *G06Q 50/26* (2012.01)
  *H04N 7/18* (2006.01)

(56) References Cited

U.S. PATENT DOCUMENTS

| | | | |
|---|---|---|---|
| 9,615,066 B1 | 4/2017 | Tran | |
| 2007/0008099 A1 | 1/2007 | Kimmel et al. | |
| 2015/0163626 A1* | 6/2015 | Zimmer | H04W 4/029 455/404.2 |
| 2015/0317356 A1* | 11/2015 | Deichler | G06Q 10/10 707/760 |
| 2015/0365246 A1* | 12/2015 | Kane | H04W 4/08 709/203 |
| 2016/0119424 A1 | 4/2016 | Kane et al. | |
| 2016/0227376 A1 | 8/2016 | Hernoud et al. | |
| 2017/0094474 A1 | 3/2017 | Hernoud et al. | |
| 2017/0180814 A1 | 6/2017 | Stathacopoulos et al. | |
| 2017/0332204 A1 | 11/2017 | Hernoud et al. | |
| 2018/0299540 A1* | 10/2018 | Cardno | G01S 13/75 |
| 2019/0116466 A1 | 4/2019 | Hernoud et al. | |
| 2019/0364389 A1 | 11/2019 | Hernoud et al. | |
| 2020/0037125 A1* | 1/2020 | Neuert | G08G 1/00 |
| 2020/0196108 A1 | 6/2020 | Hernoud et al. | |
| 2020/0389335 A1* | 12/2020 | Kane | H04W 4/021 |
| 2021/0314757 A1 | 10/2021 | Pellegrini et al. | |
| 2022/0014895 A1 | 1/2022 | Horelik et al. | |

OTHER PUBLICATIONS

Screenshot Hitachi Ventara hitachivantara.com/en.us/video/demonstration-hitachi-visularization-hitachi-visualization.html, 1 page, Accessed on Mar. 29, 2021.
Hitachi Visualization Suite Datasheet, 2 pages, Aug. 2019.
Trinity ICCC Brochure Trinity Mobility, Pvt. Ltd. Bengaluru, Kornataka, 4 pages, www.trinitymobility.com, Accessed on Mar. 29, 2021.
Mehboob, Fozia, et al., "Glyph-based video visualization on Google Map for surveillance in smart cities," EURASIP Journal on Image and Video Processing, (2017) 2017:28, Dec. 4, 2017 (16 pgs).
India Office Action, Indian Patent Office, IN Application No. 202214011942, dated Oct. 17, 2022 (6 pgs).

* cited by examiner

| | | |
|---|---|---|
| 180 ⊙ 182 125 | VMB (Variable Message Boards) | |
| 184 ⊙ 186 125 | Water Meters | 188 ⊙ 190 188a |
| 192 ⊙ 194 125 | Power Meters | |
| 196 | City buses and garage trucks | |

FIG. 8A

SMART CITIES MAP-BASED ALERT VISUALIZATION

This is a continuation of co-pending U.S. patent application Ser. No. 17/215,790, filed Mar. 29, 2021, and entitled "SMART CITIES MAP-BASED ALERT VISUALIZATION", which is incorporated herein by reference.

TECHNICAL FIELD

The present disclosure relates generally to visualization of alerts within a smart city. More particularly, the present disclosure relates to visualization of alerts within a smart city along with an indication of the asset providing the alert.

BACKGROUND

Smart cities can deploy a substantial number of assets such as security cameras and other security devices in order to monitor activity within the smart city. In many cases, a smart city may include a monitoring service having a video wall. Various alerts, video streams and the like may be displayed on the video wall. It will be appreciated that due to the large number of assets such as security cameras and other security devices, it can be difficult to quickly ascertain whether a particular alert represents a minor problem that may present a nuisance, or a major problem that may present a major disruption to life in the smart city. What would be desirable are methods for providing a map-based visualization of alerts along with the assets providing the alerts and a relative priority of each alert.

SUMMARY

The present disclosure relates generally to visualization of alerts within a geographical region, such as a smart city, a campus, a facility and/or a building. In an example, a method provides for monitoring a geographic region for alerts that are generated by a plurality of assets that are disposed within the geographic region. The method includes receiving, at a server or other device, information from the plurality of assets that are disposed within the geographic region over time. The information includes indications of alerts generated by one or more of the plurality of assets that are disposed within the geographic region, and the plurality of assets include assets of two or more different asset types. The server or other device generates a map of the geographic region that includes a map representation of the geographic region and a plurality of asset icons each positioned at a location on the map representation that corresponds to a physical location of the corresponding asset in the geographic region Each of the plurality of asset icons visually identify the asset type of the corresponding asset from the two or more different asset types. The map includes one or more alert icons each corresponding to an active alert generated by one of the plurality of assets in the geographic region, each of the one or more alert icons positioned at a location adjacent to or partially overlapping the asset icon of the asset that generated the active alert. At least some of the one or more alert icons visually identify an alert type of the corresponding active alert from two or more different alert types and at least some of the one or more alert icons visually identify a priority level of the corresponding active alert from two or more different priority levels. The server or other device displays the generated map on a display. The server or other device receives updated information from the plurality of assets over time, updates the map resulting in an updated map, and displays the updated map on the display.

In another example, a non-transient, computer-readable storage medium has instructed stored thereon. When the instructions are executed by one or more processors, the one or more processors are caused to receive information from the plurality of assets that are disposed within a geographic region over time, and to generate a map of at least part of the geographic region. The information includes indications of alerts generated by one or more of a plurality of assets that are disposed within the geographic region. The plurality of assets include assets of two or more different asset types. The map of the geographic region includes a plurality of asset icons each positioned at a location on the map that corresponds to a physical location of the corresponding asset in the geographic region. Each of the plurality of asset icons visually identifies the asset type of the corresponding asset from the two or more different asset types. The map of the geographic region includes one or more alert icons each corresponding to an active alert generated by one of the plurality of assets in the geographic region. Each of the one or more alert icons positioned at a location adjacent to or partially overlapping the asset icon of the asset that generated the active alert. The one or more processors are caused to display the generated map on a display. The one or more processors are caused to receive updated information from the plurality of assets over time, update the map resulting in an updated map, and display an updated map on the display.

Another example provides a method of monitoring a geographic area for alerts. The geographic area is divided into a plurality of jurisdictions with a plurality of assets disposed within each of the plurality of jurisdictions. The method includes receiving, at a server or other device, information from each of the plurality of assets that are disposed within each of the plurality of jurisdictions. The information includes indications of alerts generated by one or more of the plurality of assets that are disposed within each of the plurality of jurisdictions. The server or other device generates, for each of the plurality of jurisdictions, an aggregate representation of the alerts generated by one or more of the plurality of assets that are disposed within the corresponding jurisdiction of the plurality of jurisdictions. The server or other device generates and displays a map of the geographic area that includes the aggregate representation of the alerts generated by the one or more of the plurality of assets that are disposed within each jurisdiction of the plurality of jurisdictions. An indication that the user desires additional information pertaining to one of the aggregate representations is accepted from a user. In some cases, in response to accepting from the user the indication that the user desires additional information pertaining to one of the aggregate representations, the server or other device displays one or more screens that provide additional information pertaining to one of the aggregate representations, wherein the additional information includes asset icons representing each of the assets within the jurisdiction as well as related alert icons representing each of the alerts generated by each of the assets within the jurisdiction.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 8A and 8B together provide geographical representations of various assets and alerts;

Figure 1:
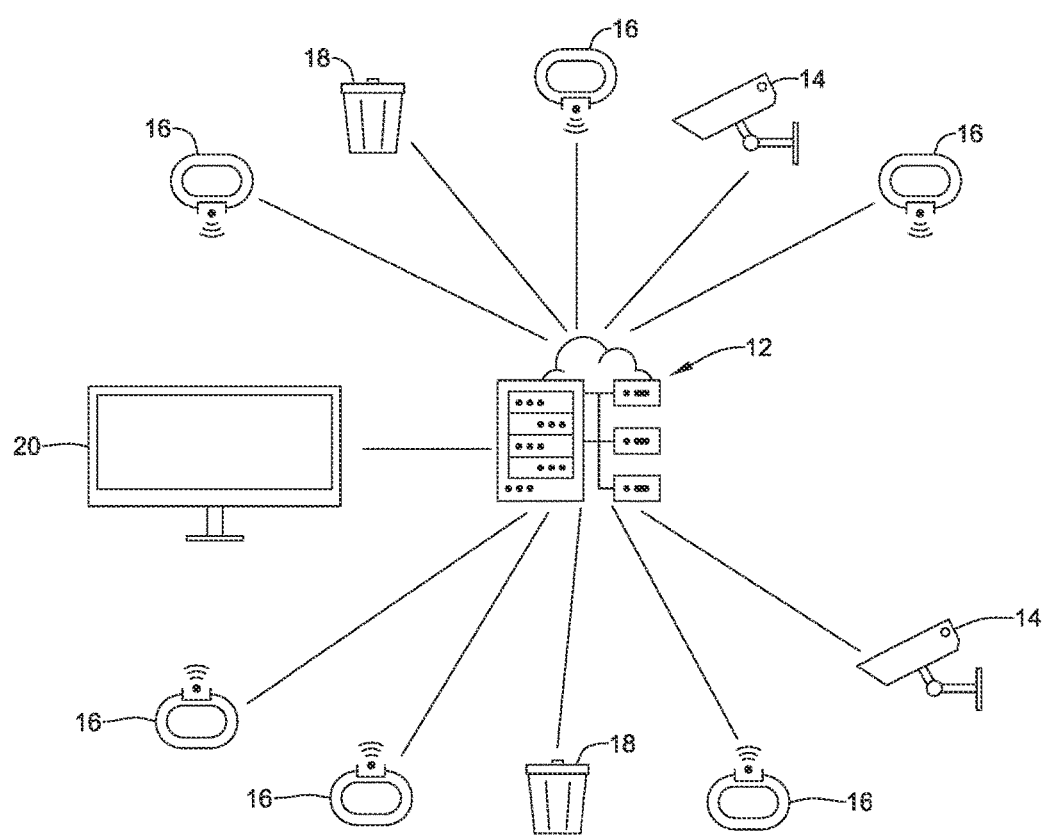
FIG. 1 is a schematic diagram showing an illustrative system for supporting smart cities with smart city assets.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic diagram of an illustrative monitoring system 10 for a smart city. While a smart city application is used as an example in this disclosure, it is contemplated that the present disclosure can be applied to any suitable application, such as monitoring various geographically spaced facilities of an organization, monitoring a particular facility or campus of an organization, monitoring a building, and/or monitoring a particular event such as the Olympic games, the NFL Superbowl and/or any other suitable application. These are just examples.

In the example shown, the monitoring system 10 includes a Command Center Platform (CCP) server 12. The CCP server 12 may represent a single server. The CCP server 12 may represent a plurality of linked servers that may be at a central location or may be distributed throughout the smart city. The CCP server 12 may represent a cloud-based server. The CCP server 12 may be configured to receive information such as sensor signals, videos streams, and the like, from a plurality of assets that are disposed about the smart city (or other geographic region) and are operably coupled with the CCP server 12.

Examples of assets include video cameras 14 and sensors 16. In some cases, at least some of the video cameras 14 and/or the sensors 16 may communicate wirelessly with the CCP server 12. At least some of the video cameras 14 may be operably coupled to a wired network running through the smart city. The video cameras 14 may provide live feeds of video streams from each of the video cameras 14 to the CCP server 12. The CCP server 12 may store these video streams over time, for subsequent use and reference. At least some of the sensors 16 may provide periodic sensor signals to the CCP server 12. At least some of the sensors 16 may provide continuous or near-continuous sensor signals to the CCP server 12. In some cases, there may be intervening components between the video cameras 14 and/or sensors 16 and the CCP server 12. These intervening components may buffer, process, filter, add metadata, and/or otherwise condition and/or process the video camera 14 and/or sensor 16 data before providing the original and/or processed data to the CCP server 12.

In the smarty city application, the sensors 16 may individually represent any of a variety of different types of sensors, including but not limited to noise sensors, hazardous material sensors, parking sensors, lighting sensors and the like. Garbage bin sensors 18 may, for example, provide the CCP server 12 with an indication that a particular garbage bin is full and needs to be emptied. Alternatively, in some cases, a garbage bin sensor 18 may inform the CCP server 12 that a particular garbage bin is not filling up as fast as expected, and that a planned emptying of the particular garbage bin can be delayed.

The monitoring system 10 includes a video display wall 20. While illustrated as a single monitor, the video display wall 20 may include a large number of monitors that are wall-mounted adjacent to one another, so that a user is able to simultaneously view a large number of photos, video streams, social monitoring feeds, sensor data and the like. In some cases, the video display wall 20 may be used to display a geographic map that is generated by the CCP server 12 and that includes icons indicating the relative positions of a number of assets such as but not limited to the video cameras 14, the sensors 16 and the garbage bin sensors 18 as well as including icons that indicate particular alarms that are being raised by at least some of those assets. In some cases, the CCP server 12 may be provided with the location of each of the assets so that the assets can be accurately displayed on the geographic map. This may include receiving the latitude and longitude of each asset, sometimes during initial commissioning of the monitoring system 10. This may include receiving GPS (global positioning system) coordinates for each of the assets, for example.

Figure 2:
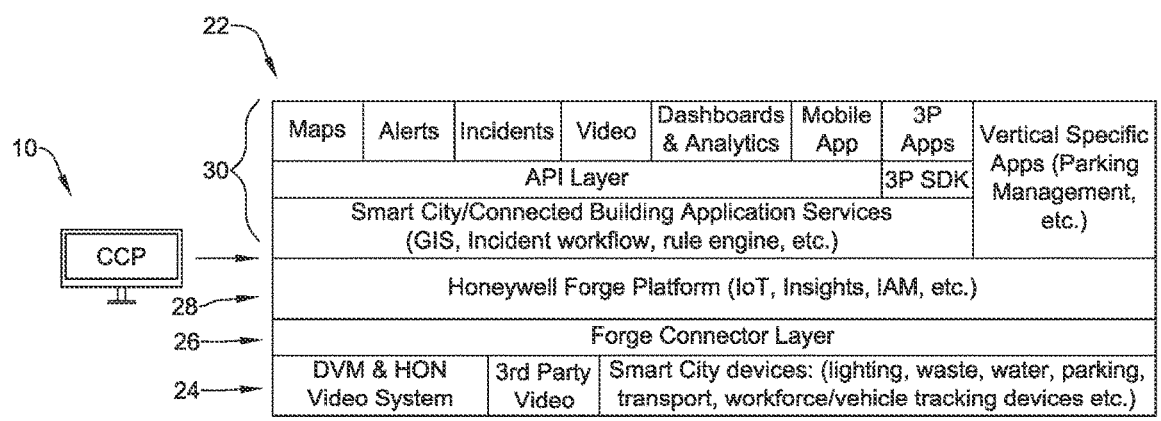
FIG. 2 is a schematic diagram showing an illustrative system architecture for supporting smart cities with smart city assets.

In FIG. 2, an illustrative architecture of the monitoring system 10 is schematically represented. In the example shown, the monitoring system 10 communicates with a variety of different services 22 shown in a table format. The lowest row of the table includes a number of assets 24, including but not limited to internal and external video systems and a variety of smart city devices. Examples of smart city devices include lighting devices, waste system devices, water system devices, parking system devices, transport system devices, people tracking devices, vehicle tracking devices and others. Each of the assets 24 may be configured to communicate, either wirelessly or in a wired manner, with a connector layer 26, which in turn enables each of the assets 24 to communicate with a platform 28. The platform 28, an example of which is Honeywell Forge™, allows for intelligent processing of the data received from the number of assets 24. The platform 28, in turn, is able to apply a number of services 30. The number of services 30 may include maps, alerts, incidents, video, dashboard and analytics and a mobile app. The number of services 30 may include a variety of different smart city or connected building applications, as well as an API layer as shown.

Figure 3:
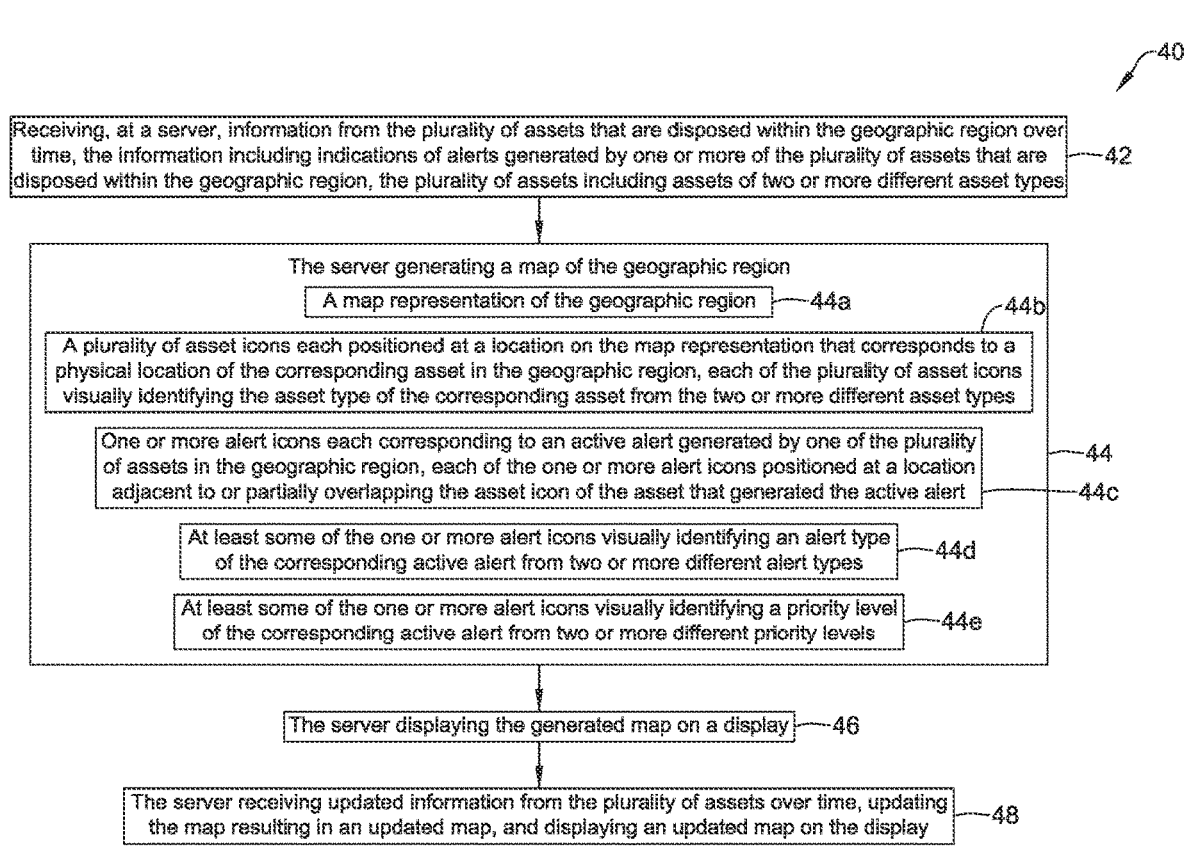
FIG. 3 is a flow diagram showing an illustrative method.

FIG. 3 is a flow diagram showing an illustrative method 40 of monitoring a geographic region for alerts generated by a plurality of assets disposed within the geographic region. The method includes receiving, at a server, information from the plurality of assets that are disposed within the geographic region over time. The information includes indications of alerts generated by one or more of the plurality of assets that are disposed within the geographic region. The plurality of assets include assets of two or more different asset types, as indicated at block 42. The server generates a map of the geographic region, as indicated at block 44.

In some cases, the map of the geographic region includes a map representation of the geographic region, as indicated at block 44*a*. The map of the geographic region may include a plurality of asset icons each positioned at a location on the map representation that corresponds to a physical location of the corresponding asset in the geographic region. Each of the plurality of asset icons visually identifies the asset type of the corresponding asset from the two or more different asset types, as indicated at block 44*b*. The map of the geographic region may include one or more alert icons each corresponding to an active alert generated by one of the plurality of assets in the geographic region. In the example shown, each of the one or more alert icons is positioned at a location adjacent to or partially overlapping the asset icon of the asset that generated the active alert, as indicated at block 44*c*. At least some of the one or more alert icons visually identify an alert type of the corresponding active alert from two or more different alert types, as indicated at block 44*d*. At least some of the one or more alert icons visually identifying a priority level of the corresponding active alert from two or more different priority levels, as indicated at block 44*e*.

The illustrative method 40 includes the server displaying the generated map on a display, as indicated at block 46. The server receives updated information from the plurality of assets over time, updates the map resulting in an updated map, and displays an updated map on the display, as indicated at block 48. In some cases, the map may further include an alert count icon for each of the plurality of assets that have a plurality of active alerts, the alert count icon visually identifying a count of the active alerts for the corresponding asset. Each of the alert count icons may be positioned at a location adjacent to or partially overlapping the alert icon of the corresponding asset.

Figure 4:
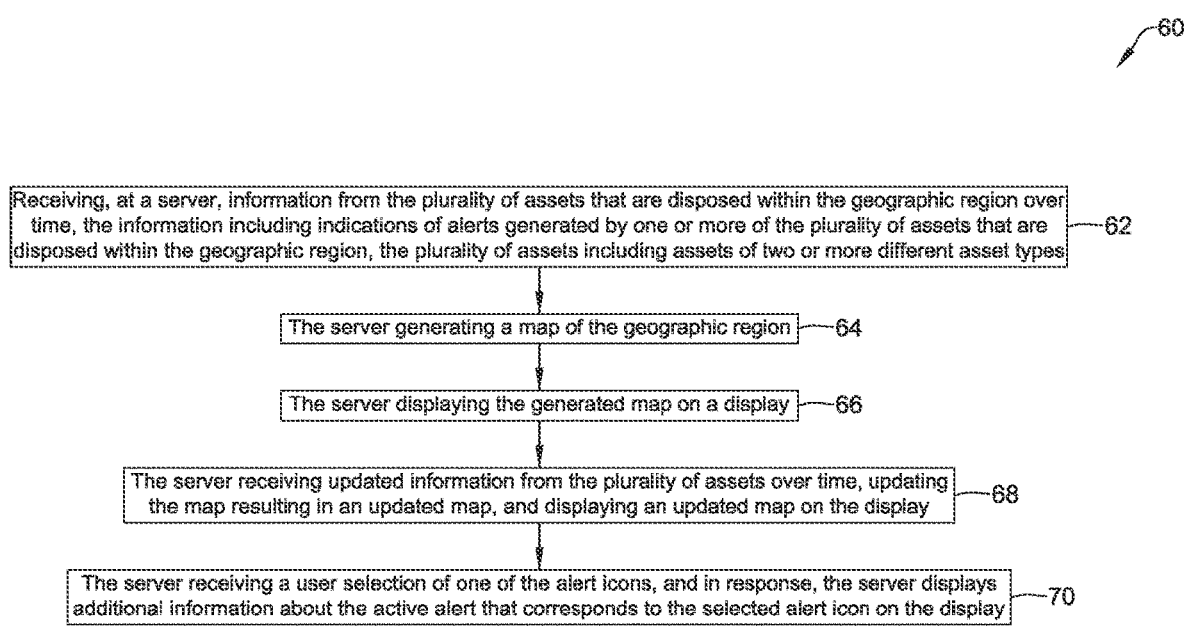
FIG. 4 is a flow diagram showing an illustrative method.

FIG. 4 is a flow diagram showing an illustrative method 60 of monitoring a geographic region for alerts generated by a plurality of assets disposed within the geographic region. The method includes receiving, at a server, information from the plurality of assets that are disposed within the geographic region over time. The information includes indications of alerts generated by one or more of the plurality of assets that are disposed within the geographic region. The plurality of assets include assets of two or more different asset types, as indicated at block 62. The server generates a map of the geographic region, as indicated at block 64.

In some cases, the map of the geographic region includes a map representation of the geographic region. The map of the geographic region may include a plurality of asset icons each positioned at a location on the map representation that corresponds to a physical location of the corresponding asset in the geographic region. Each of the plurality of asset icons visually identify the asset type of the corresponding asset from the two or more different asset types. The map of the geographic region may include one or more alert icons each corresponding to an active alert generated by one of the plurality of assets in the geographic region. Each of the one or more alert icons positioned at a location adjacent to or partially overlapping the asset icon of the asset that generated the active alert. At least some of the one or more alert icons visually identify an alert type of the corresponding active alert from two or more different alert types. At least some of the one or more alert icons visually identifying a priority level of the corresponding active alert from two or more different priority levels. The illustrative method 60 includes the server displaying the generated map on a display, as indicated at block 66. The server receives updated information from the plurality of assets over time, updates the map resulting in an updated map, and displays an updated map on the display, as indicated at block 68.

In some cases, the illustrative method 60 may further include the server receiving a user selection of one of the alert icons, and in response, the server displays additional information about the active alert that corresponds to the selected alert icon on the display, as indicated at block 70. When the selected alert icon correspond to an alert generated by a video camera asset, and the additional information may include a video stream captured by the video camera asset. The additional information may include information from the asset that generated the alert that corresponds to the selected alert icon, as well as information from one or more assets that neighbor the asset that generated the alert that corresponds to the selected alert icon. In some cases, the selected alert icon may correspond to an alert generated by a video camera asset, and the one or more assets that neighbor the asset that generated the alert that corresponds to the selected alert icon may include video camera assets and the additional information may include a video stream captured by the video camera asset as well as a video stream captured by each of the neighboring video camera assets. In some cases, the video stream captured by the video camera asset as well as the video streams captured by the neighboring video camera assets may be displayed in adjacent panels on the display.

Figure 5:
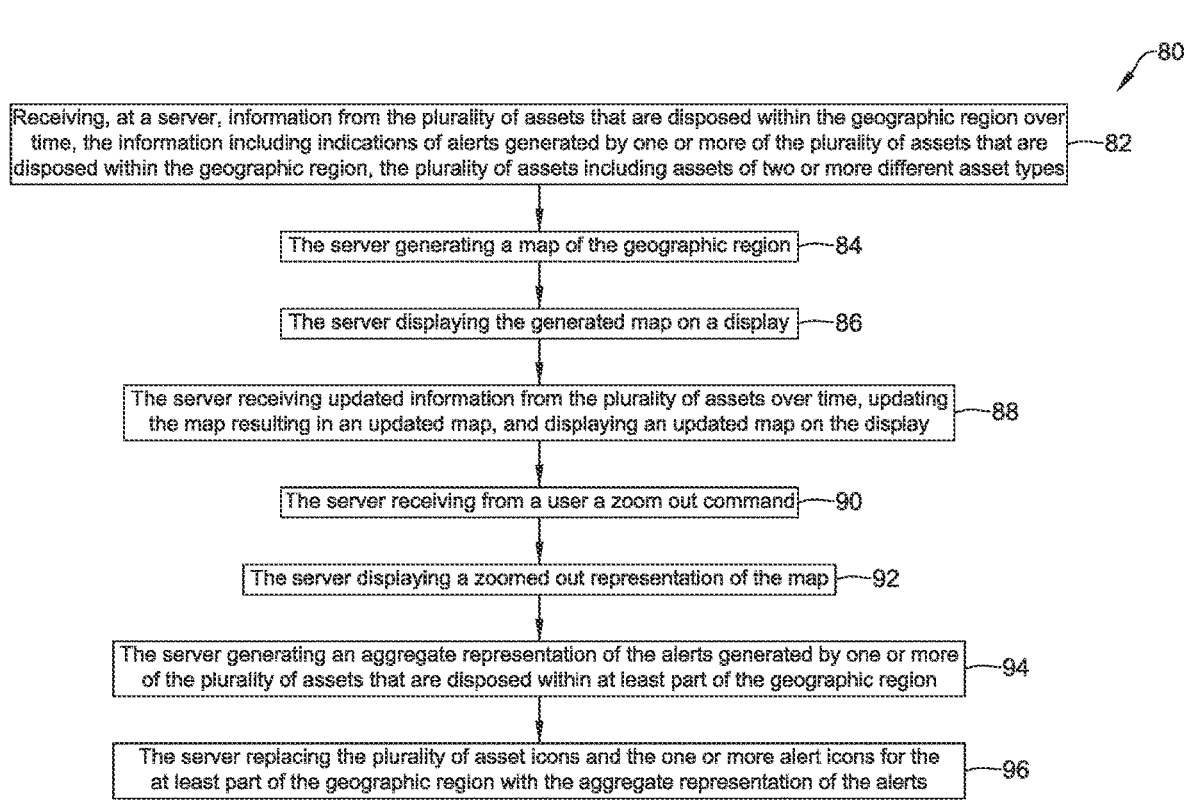
FIG. 5 is a flow diagram showing an illustrative method.

FIG. 5 is a flow diagram showing an illustrative method 80 of monitoring a geographic region for alerts generated by a plurality of assets disposed within the geographic region. The method includes receiving, at a server, information from the plurality of assets that are disposed within the geographic region over time. The information includes indications of alerts generated by one or more of the plurality of assets that are disposed within the geographic region. The plurality of assets include assets of two or more different asset types, as indicated at block 82. The server generates a map of the geographic region, as indicated at block 84.

In some cases, the map of the geographic region includes a map representation of the geographic region. The map of the geographic region may include a plurality of asset icons each positioned at a location on the map representation that corresponds to a physical location of the corresponding asset in the geographic region. Each of the plurality of asset icons visually identify the asset type of the corresponding asset from the two or more different asset types. The map of the geographic region may include one or more alert icons each corresponding to an active alert generated by one of the plurality of assets in the geographic region. Each of the one or more alert icons positioned at a location adjacent to or partially overlapping the asset icon of the asset that generated the active alert. At least some of the one or more alert icons visually identify an alert type of the corresponding active alert from two or more different alert types. At least some of the one or more alert icons visually identify a priority level of the corresponding active alert from two or more different priority levels. The illustrative method 80 includes the server displaying the generated map on a display, as indicated at block 86. The server also receives updated information from the plurality of assets over time, updates the map resulting in an updated map, and displays an updated map on the display, as indicated at block 88.

In some cases, the method 80 may further include the server receiving a zoom out command from a user, as indicated at block 90. In response, the server may display a zoomed out representation of the map, as indicated at block 92. The server may generate an aggregate representation of the alerts generated by one or more of the plurality of assets that are disposed within at least part of the geographic region, as indicated at block 94. The server may replace the plurality of asset icons and the one or more alert icons for the at least part of the geographic region with the aggregate representation of the alerts, as indicated at block 96. The aggregate representation of the alerts may include a total number of alerts that correspond to the at least part of the geographic region. In some cases, the aggregate representation of the alerts may include a total number of alerts that correspond to the at least part of the geographic region for each of the two or more different priority levels. At least part of the geographic region may be predefined by a jurisdictional boundary.

Figure 6:
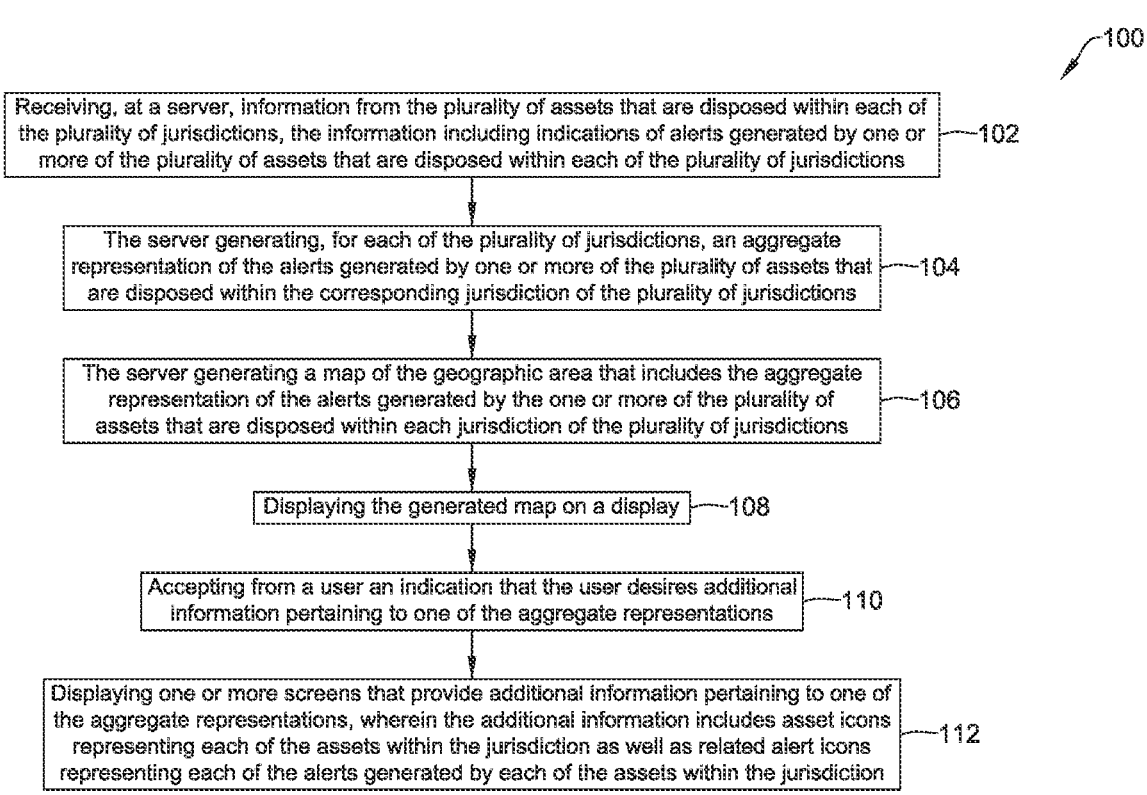
FIG. 6 is a flow diagram showing an illustrative method.

FIG. 6 is a flow diagram showing an illustrative method 100 of monitoring a geographic area for alerts. In this example, the geographic area is divided into a plurality of jurisdictions with a plurality of assets disposed within each of the plurality of jurisdictions. The method 100 includes receiving, at a server, information from each of the plurality of assets that are disposed within each of the plurality of jurisdictions. The information includes indications of alerts generated by one or more of the plurality of assets that are disposed within each of the plurality of jurisdictions, as indicated at block 102. In the example show, the server generates, for each of the plurality of jurisdictions, an aggregate representation of the alerts generated by one or more of the plurality of assets that are disposed within the corresponding jurisdiction of the plurality of jurisdictions, as indicated at block 104.

The server generates a map of the geographic area that includes the aggregate representation of the alerts generated by the one or more of the plurality of assets that are disposed within each jurisdiction of the plurality of jurisdictions, as indicated at block 106. The generated map is displayed on a display, as indicated at block 108. An indication that the user desires additional information pertaining to one of the aggregate representations is accepted from the user, as indicated at block 110. In some cases, in response to accepting from the user the indication that the user desires additional information pertaining to one of the aggregate representations, the server displaying one or more screens that provide additional information pertaining to one of the aggregate representations, wherein the additional information include asset icons representing each of the assets within the jurisdiction as well as related alert icons representing each of the alerts generated by each of the assets within the jurisdiction, as indicated at block 112.

In some cases, each asset icon includes a graphical representation that identifies a particular asset type of the corresponding asset from a plurality of different asset types. Examples of asset icons are shown in FIGS. 7A, 7B and 8A, 8B. In some cases, each alert icon may include a graphical representation that identifies a particular alert type from a plurality of different alert types.

Figure 7A:
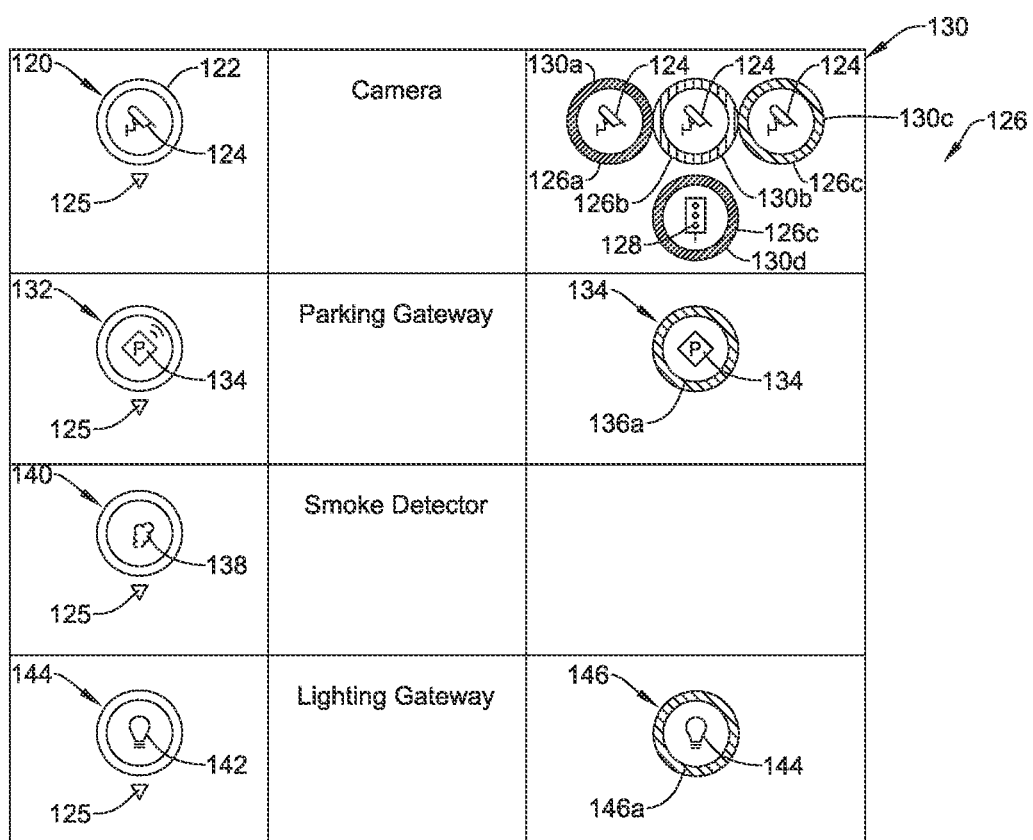
FIGS. 7A and 7B together provide graphical representations of various assets and alerts.

Referring to FIG. 7A, a camera icon 120 is shown that includes a circle 122 and a camera image 124 displayed within. The illustrative camera icon 120 includes an arrow 125 that may be used to locate the camera icon 120 at a specific geographic location represented by a particular map location on the geographic map. Alerts that may be raised in response to a video feed provided by a video camera include, but are not limited to, crowd detection, such as an unexpectedly large number of people congregating at a particular location, or the presence of people at a time in which no people are expected. Additional examples include automatic recognition of license plate numbers and red light violations at street lights. Camera-based alerts may also be displayed as a result of general city surveillance. These are just examples.

A number of alert icons 126 may be generated by a camera represented by the camera icon 120, and may be displayed on a geographic map adjacent or at least partially overlapping the camera icon 120 itself. Illustrative alert icons are shown in the right column of FIGS. 7A, 7B, 8A and 8B. The first three alert icons 126 shown in FIG. 7A, individually labeled as 126*a*, 126 and 126*c*, each include the camera image 124, indicating that the particular alert is camera-related. The fourth alert icon 126 includes a traffic light image 128, indicating that this particular alert pertains to a traffic light violation detected by the camera, such as a person or vehicle crossing a red light, for example.

In some cases, each alert icon 126 includes a color ring 130. The color ring 130 may be any of a variety of different colors, with each color representing an alert priority or an alert seriousness. Relatively minor alerts may have a color ring 130 that is yellow in color. More serious alerts may have a color ring 130 that is orange in color. More serious alerts yet may have a color ring 130 that is red in color. These colors are just illustrative, and are shown in the drawings using differing shading patterns. As illustrated, the alert icon 126*a* includes a color ring 130*a* that represents a color red, the alert icon 126*b* includes a color ring 130*b* that represents a color orange, the alert icon 126*c* includes a color ring 130*c* that represents a color yellow and the alert icon 126*d* includes a color ring 130*d* that represents a color red.

In FIG. 7A, a parking gateway icon 132 includes a parking sign image 134. The parking gateway icon 132 may be used to represent a gateway that communicates with parking sensors that can indicate whether a particular parking spot has a car parked in the spot. An alert icon 136 includes the parking sign image 134, indicating that the alert is parking-related. A color ring 136*a*, which in this case represents the color yellow, or a medium-seriousness alert, is included within the alert icon 136. The alert icon 136 may, for example, indicate whether a particular parking garage, ramp or other parking structure is full, nearly full or partially full.

A smoke detector icon 138 includes a smoke image 140 that will be repeated in any alert icon that is triggered by a smoke detector represented by the smoke detector icon 138. The smoke detector icon 138 may trigger an alert meaning that smoke has been detected, a fire has been detected, or gaseous combustion products have been detected.

A lighting gateway icon 142 includes a light bulb image 142. An alert icon 146 includes the light bulb image 142, indicating the source of the alert. The alert icon 146 also includes a color ring 146*a* representing the color yellow. Alerts may be raised to indicate that street (or other) lights have been turned on. Alerts may be raised to indicate that street (or other) lights have not yet turned on, even though street lights are scheduled to turn on, or other burned out. Weather conditions may make ambient lighting less than expected. In these situations, a lighting alert may be raised to indicate that certain street lighting should be turned on, even though not scheduled to be on.

Figure 7B:
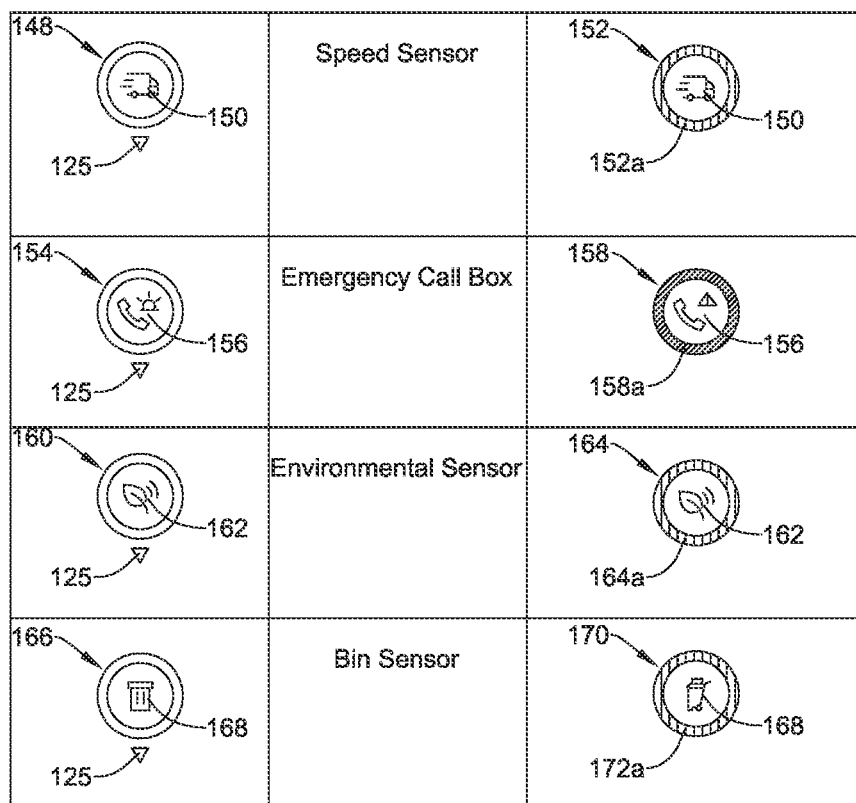

Continuing on with FIG. 7B, a speed sensor icon 148 includes a speeding vehicle image 150. The speeding vehicle image 150 can be seen as being repeated in an alert icon 152, indicating the source of the alert. The alert icon 152 includes a color ring 152*a*, which as shown may represent a color orange, indicating a medium seriousness or a medium priority alert. A speeding vehicle may be detected using a radar gun, for example. A speeding vehicle may also be detected by timing the vehicle between two check points, where the distance between the two check points is known. Vehicle speed may also be estimated by video processing of a video stream showing the vehicle.

An emergency icon 154 includes an emergency image 156. An alert icon 158 includes the emergency image 156, indicating the source of the alert. The emergency icon 154 may be considered as representing a location of an emergency phone, for example. The emergency icon 154 may be considered as representing not only the location of an emergency phone, but in some cases could instead be a simple PANIC button that a user can select to obtain assistance. The alert icon 158 includes a color ring 158*a* which as shown may represent a color red, indicating a high seriousness or a high priority alert.

An environmental sensor icon 160 includes a leaf image 162. An alert icon 164 includes the leaf image 162, indicating the source of the alert. The alert icon 164 may indicate that an environmental sensor such as a carbon monoxide sensor or a carbon dioxide sensor has detected unsafe or potentially unsafe levels of either carbon monoxide or carbon dioxide, as the case may be. The alert icon 162 includes a color ring 162*a* which as shown may represent a color orange, indicating a medium seriousness or a medium priority alert.

A bin sensor icon 166 includes a garbage bin image 168. An alert icon 170 includes the garbage bin image 168, indicating the source of the alert. In on example, the alert icon 170 may indicate that a particular garbage bin is full and needs to be emptied.

Figure 8B:
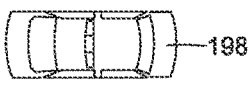

FIGS. 8A and 8B together provide additional examples of asset icons and corresponding alert types. Starting with FIG. 8A, a VMB (variable message board) icon 180 includes a message board image 182, which may be displayed as part of an alert icon that is triggered by the VMB icon 180 in order to indicate the source of the alert. Variable message boards may be used to inform citizens of any emergency scenario, traffic congestion and/or any other important information. This may include addressable signs displayed along highways and on overpasses, for example.

A water meter icon 184 includes a water meter image 186 that may be displayed as part of an alert icon that is triggered by the water meter icon 184 in order to indicate the source of the alert icon. A water meter measures water consumption. In some cases, an alert icon such as an alert icon 188 may be displayed if the water meter represented by the water meter icon 184 detects unusually large volumes of water being consumed, as this can in some cases indicate a possible water leak. As shown, the alert icon 188 includes a water level image 190 that may indicate a possible water leak. The alert icon 188 includes a color ring 188*a* which as shown may represent a color orange, indicating a medium seriousness or a medium priority alert.

A power meter icon 192 includes a power meter image 194 that may be displayed as part of an alert icon that is triggered by the power meter icon 192 in order to indicate the source of the alert icon. A power meter measures electrical consumption.

There may be a desire to track city vehicles moving around the smart city, including knowing where the city vehicles are, and whether any of the city vehicles are either at an unexpected location or are being driven in an unsafe manner, such as speeding. A city vehicle icon 196 may be used to represent the current location of each of a variety of different city vehicles such as city buses and garbage trucks. Likewise, and as shown in FIG. 8B, a police vehicle icon 198, an ambulance icon 200 and a firetruck icon 202 may be displayed. It will be appreciated that each of these icons 196, 198, 200, 202 may be used to track moving assets as they move around the smart city.

A PA icon 204 includes a PA (public announcement) image 206 that may be displayed as part of an alert icon that is triggered by the PA icon 206 in order to indicate the source of the alert icon. A PA device is a device used to make important public announcements. An alert icon 208 includes the PA image 206. The alert icon 208 includes the PA image 206 as well as a color ring 208*a* which as shown may represent a color orange, indicating a medium seriousness or a medium priority alert. The alert icon 208 may be displayed when the PA system is currently being used to broadcast an public announcement and/or when the PA system is currently down or other wise needs service. These are just examples.

Figure 9A:
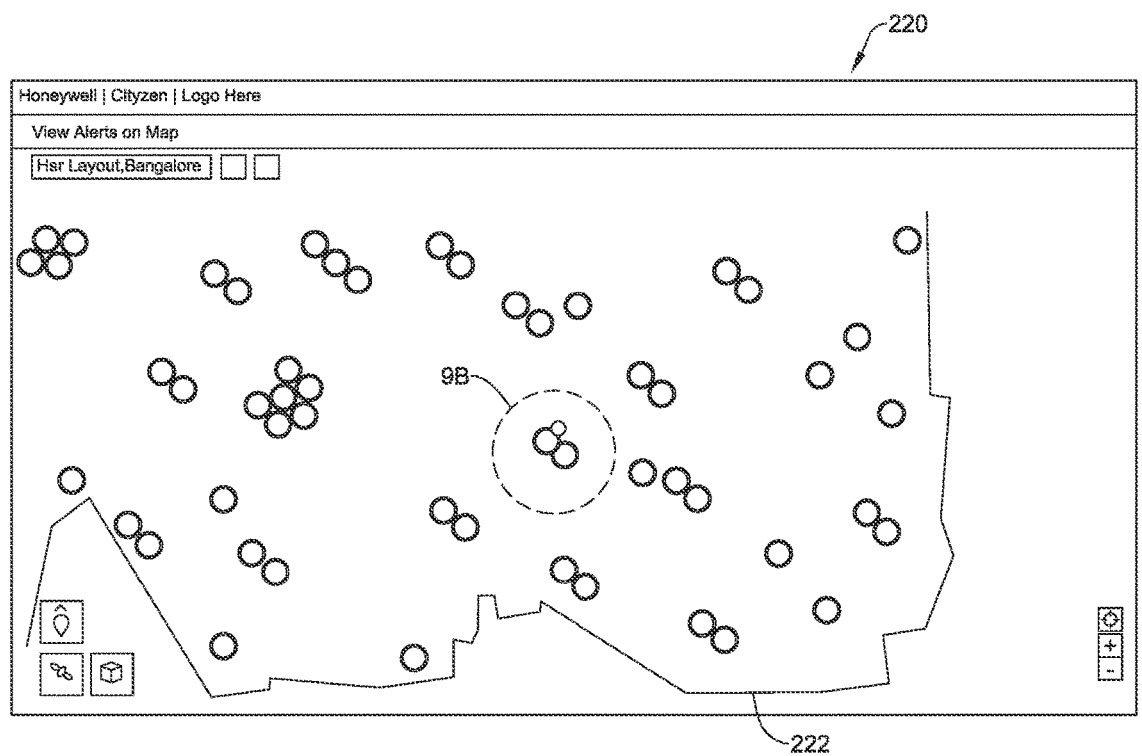
FIG. 9A is a screen shot showing an illustrative geographic map.

FIG. 9A is a screen shot showing an illustrative geographic map 220. As shown, it can be seen that a portion of a jurisdictional boundary 222 is displayed on the geographic map 220. If the person viewing the geographic map 220 were to zoom out, for example, the entire jurisdictional boundary 222 may be visible. It will be appreciated that not only can a user zoom in and zoom out, but the user can also move laterally (e.g. pan), thus changing what is displayed at the center of the geographic map 220. The illustrative geographic map 220 includes a number of asset icons. Some of the asset icons include corresponding alert icons that at least partially overlap the particular asset icon triggering the displayed alert icons. Some of the asset icons do not include any corresponding alert icons, meaning that the assets represented by those asset icons are not currently detecting any problems that would necessitate an alert. FIG. 9A includes a dashed line circle near a center of the geographic map 220. An enlarged view of a portion of the geographic map 220 is shown in FIG. 9B.

Figure 9B:
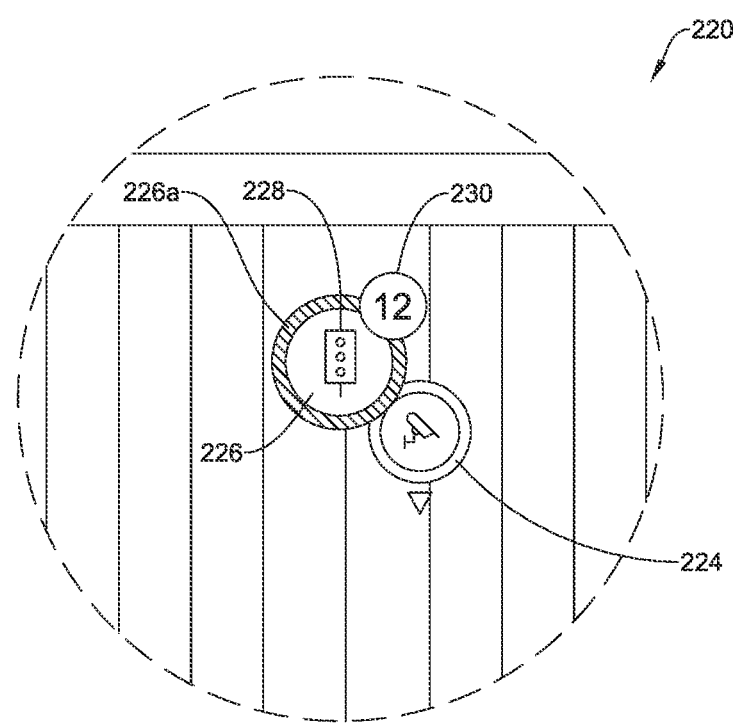
FIG. 9B is an enlarged view of a portion of the screen shot of FIG. 9A.

FIG. 9B shows a portion of the geographic map 220 corresponding to the dashed line circle in FIG. 9A. The geographic map 220 includes an asset icon 224 that, as seen, is a camera icon as shown in FIG. 7A. Displayed next to (and overlapping) the asset icon 224 is an alert icon 226 that includes a stop light image 228. In this example, the alert icon 226 represents one or more cases of a vehicle running a red light as determined by video analytics. In this particular example, there have actually been a total of 12 incidents of vehicles running red lights as detected by the particular camera represented by the asset icon 224. This can be seen by a displayed number 230, which indicates to the user the total number detected over a particular period of time. In some cases, the particular period of time may be programmable. The alert icon 226 includes a color ring 226a that represents a color red in this instance, indicating a high level of seriousness and/or priority.

Figure 10:
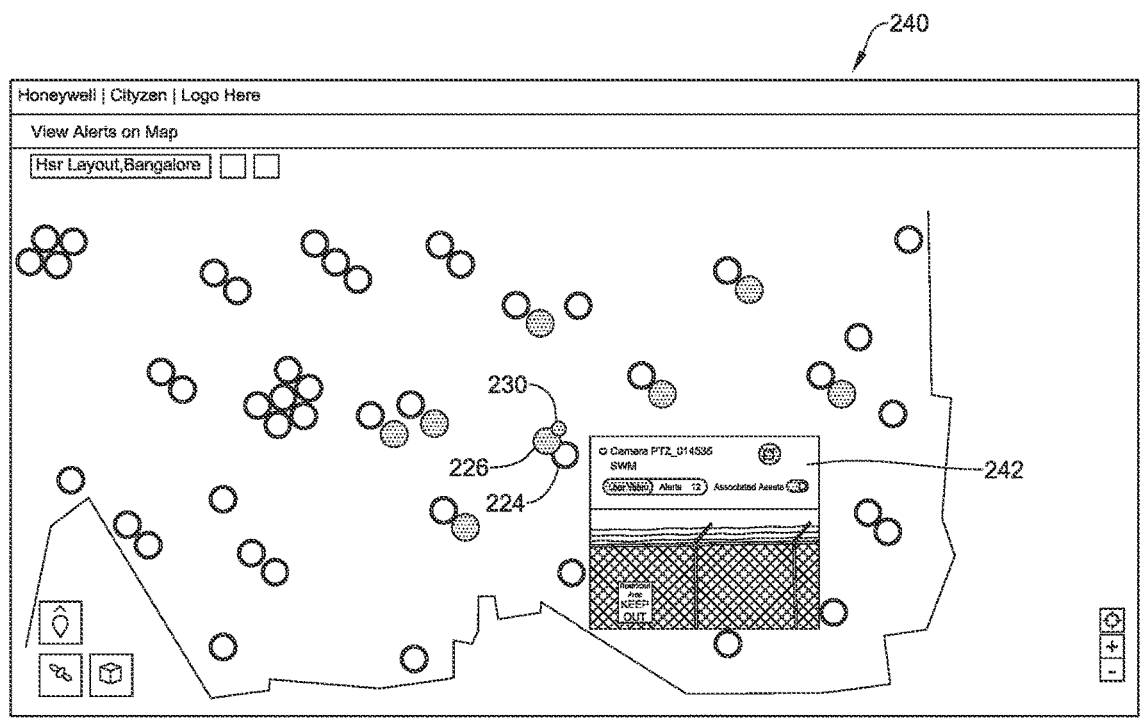
FIG. 10 is a screen shot showing an illustrative geographic map.

In some cases, a user may wish to investigate an alert by checking nearby assets. For example, the user may wish to check video streams from cameras that are nearby the camera represented by the asset icon 224. FIG. 10 shows a geographic map 240 that is similar to the geographic map 220 shown in FIG. 9A, but nearby cameras can be seen as being highlighted in a different color that shows which assets have been selected. Selection may be as simple as choosing all cameras within a particular radius, say a quarter mile. In some cases, a user may individually select particular cameras. In some cases, the assets may be pre-assigned to groups during commissioning of the system. The groupings may be designed to automatically identify assets to an operator that may provide relevant additional information in response to a particular event type that is detected by a particular asset. In the example shown, when the operator selects one of the cameras, a corresponding video stream from the selected camera is displayed within a popup window 242 that is superimposed over the geographic map 240.

Figure 11:
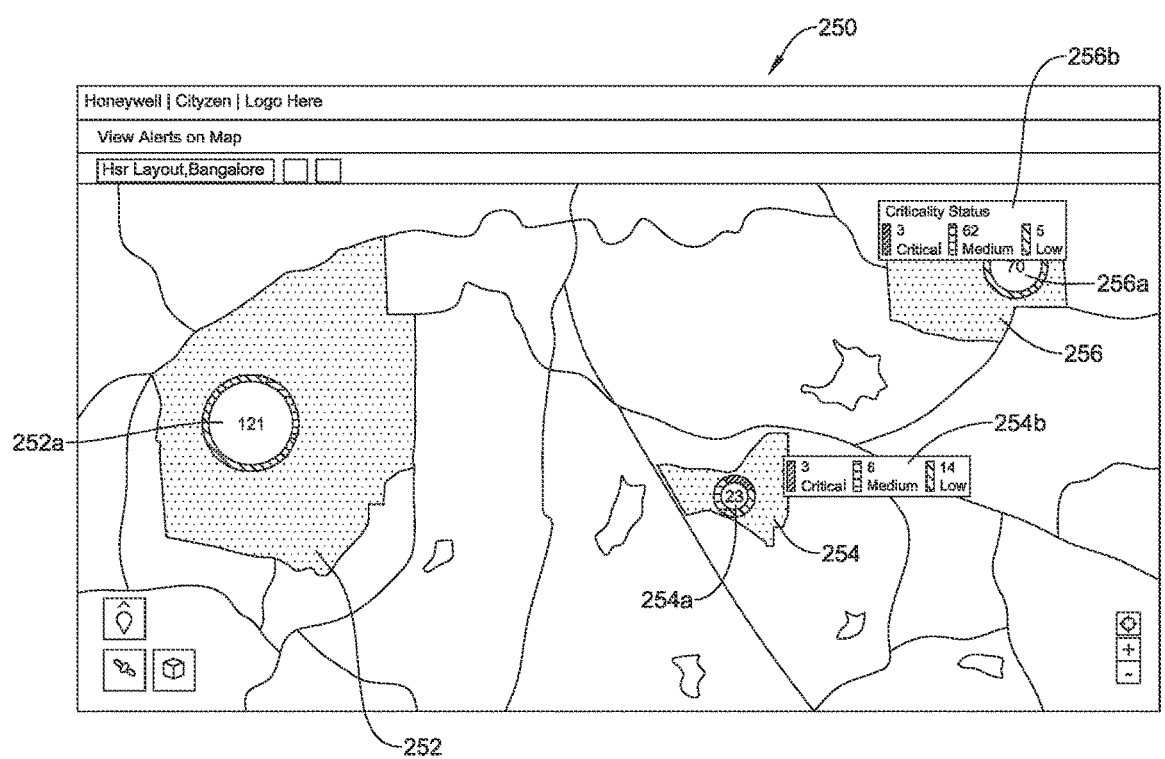
FIG. 11 is a screen shot showing an illustrative geographic map.

In some cases, a user may wish to zoom out, and view a larger geographic area. FIG. 11 shows a geographic map 250 that includes a first jurisdictional boundary 252, a second jurisdictional boundary 254 and a third jurisdictional boundary 256. Each of the jurisdictional boundaries 252, 254, 256 may represent neighborhoods or any other desired subdivisions. The first jurisdictional boundary 252 includes a first summary icon 252a that provides a numerical summation of current alerts within the first jurisdictional boundary 252. In some cases, a periphery of the first summary icon 252a may be color coded, relative to the number of critical alerts, medium alerts and low priority alerts currently being reported. The second jurisdictional boundary 254 includes a second summary icon 254a and the third jurisdictional boundary 236 includes a third summary icon 256a. In some cases, the geographic map 250 may include more details as to the relative number of critical, medium and low priority alerts. For example, the second jurisdictional boundary 254 includes a table 254b indicating that there are currently 3 critical alerts, 6 medium alerts and 14 low priority alerts. It will be appreciated that the periphery of the second summary icon 254a also provides this information. The third jurisdictional boundary 256 includes a table 256b indicating that there are currently 3 critical alerts, 62 medium alerts and 5 low priority alerts within the third jurisdictional boundary 256. In some cases, additional information may be displayed in response to a user selecting the corresponding summary icon 252a, such as the additional information similar to that provide in table 254b and 256b.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of monitoring a geographic region for alerts generated by a plurality of assets disposed within the geographic region, the method comprising:

receiving, at a server, information from the plurality of assets that are disposed within the geographic region over time, the information including indications of alerts generated by one or more of the plurality of assets that are disposed within the geographic region;

the server generating a map of the geographic region that includes:

a map representation of the geographic region;

a plurality of asset icons each positioned at a location on the map representation that corresponds to a physical location of the corresponding asset in the geographic region;

one or more alert icons each corresponding to an active alert generated by one of the plurality of assets in the geographic region, each of the one or more alert icons positioned on the map representation to visually associate the corresponding alert icon with the corresponding asset that generated the active alert, wherein at least one of the one or more alert icons visually identifying one or more of:

an alert type of the corresponding active alert from two or more different alert types;

a priority level of the corresponding active alert from two or more different priority levels;

the server displaying the generated map on a display; and the server receiving updated information from the plurality of assets over time, updating the map resulting in an updated map, and displaying an updated map on the display.

2. The method of claim 1, wherein the map further comprises an alert count icon for each of the plurality of assets that have a plurality of active alerts, the alert count icon visually identifying a count of the active alerts for the corresponding asset, each of the alert count icons positioned at a location on the map representation to visually associate the corresponding alert count icon with the corresponding asset.

3. The method of claim 1, further comprising:

the server receiving a user selection of one of the alert icons, and in response, the server displays additional information about the active alert that corresponds to the selected alert icon on the display.

4. The method of claim 3, wherein the selected alert icon corresponds to an alert generated by a video camera asset, and wherein the additional information includes a video stream captured by the video camera asset.

5. The method of claim 3, wherein the additional information includes information from the asset that generated the active alert that corresponds to the selected alert icon, as well as information from one or more assets that neighbor the asset that generated the active alert that corresponds to the selected alert icon.

6. The method of claim 5, wherein the selected alert icon corresponds to an alert generated by a video camera asset, and the one or more assets that neighbor the asset that generated the alert that corresponds to the selected alert icon comprise video camera assets, wherein the additional information includes a video stream captured by the video camera asset as well as a video stream captured by each of the neighboring video camera assets.

7. The method of claim 6, wherein the video stream captured by the video camera asset as well as the video streams captured by the neighboring video camera assets are displayed in adjacent panels on the display.

8. The method of claim 1, further comprising:
the server receiving from a user a zoom out command;
the server displaying a zoomed out representation of the map;
the server generating an aggregate representation of the alerts generated by one or more of the plurality of assets that are disposed within at least part of the geographic region; and
the server replacing the plurality of asset icons and the one or more alert icons for the at least part of the geographic region with the aggregate representation of the alerts.

9. The method of claim 8, wherein the aggregate representation of the alerts includes a total number of alerts that correspond to the at least part of the geographic region.

10. The method of claim 8, wherein the aggregate representation of the alerts includes a total number of alerts that correspond to the at least part of the geographic region for each of the two or more different priority levels.

11. The method of claim 8, wherein the at least part of the geographic region is predefined by a jurisdictional boundary.

12. The method of claim 1, wherein the plurality of assets including assets of two or more different asset types, and wherein each of the plurality of asset icons visually identifying the asset type of the corresponding asset from the two or more different asset types.

13. The method of claim 1, wherein each of the one or more alert icons is positioned adjacent to or at least partially overlapping the corresponding asset that generated the active alert.

14. A non-transitory computer-readable storage medium having stored thereon instructions that when executed by one or more processors causes the one or more processors to:
receive information from a plurality of assets that are disposed within a geographic region over time, the information including indications of alerts generated by one or more of a plurality of assets that are disposed within the geographic region;
generate a map of the geographic region that includes:
a map representation of the geographic region;
a plurality of asset icons each positioned at a location on the map representation that corresponds to a physical location of the corresponding asset in the geographic region;
one or more alert icons each corresponding to an active alert generated by one of the plurality of assets in the geographic region, each of the one or more alert icons positioned on the map representation to visually associate the corresponding alert icon with the corresponding asset that generated the active alert, wherein at least one of the one or more alert icons visually identifying one or more of:
an alert type of the corresponding active alert from two or more different alert types;
a priority level of the corresponding active alert from two or more different priority levels;
display the generated map on a display; and
receive updated information from the plurality of assets over time, update the map resulting in an updated map, and display an updated map on the display.

15. The non-transitory computer-readable storage medium of claim 14, wherein the map further comprises an alert count icon for each of the plurality of assets that have a plurality of active alerts, the alert count icon visually identifying a count of the active alerts for the corresponding asset, each of the alert count icons positioned at a location on the map representation to visually associate the corresponding alert count icon with the corresponding asset.

16. The non-transitory computer-readable storage medium of claim 14, wherein the one or more processors are further configured to receive a user selection of one of the alert icons, and in response, display additional information about the active alert that corresponds to the selected alert icon on the display.

17. The non-transitory computer-readable storage medium of claim 14, wherein the plurality of assets including assets of two or more different asset types, and wherein each of the plurality of asset icons visually identifying the asset type of the corresponding asset from the two or more different asset types.

18. The non-transitory computer-readable storage medium of claim 14, wherein each of the one or more alert icons is positioned adjacent to or at least partially overlapping the corresponding asset that generated the active alert.

19. A system for monitoring a geographic region for alerts generated by a plurality of assets disposed within the geographic region, the system comprising:
an input for receiving information from the plurality of assets that are disposed within the geographic region over time, the information includes indications of alerts generated by one or more of the plurality of assets that are disposed within the geographic region;
one or more processors operatively coupled to the input, the one or more processors configured to:
generate a map of the geographic region that includes:
a map representation of the geographic region;
a plurality of asset icons each positioned at a location on the map representation that corresponds to a physical location of the corresponding asset in the geographic region;
one or more alert icons each corresponding to an active alert generated by one of the plurality of assets in the geographic region, each of the one or more alert icons positioned on the map representation to visually associate the corresponding alert icon with the corresponding asset that generated the active alert, wherein at least one of the one or more alert icons visually identifying one or more of:
an alert type of the corresponding active alert from two or more different alert types;
a priority level of the corresponding active alert from two or more different priority levels;
display the generated map on a display;
receive updated information from the plurality of assets over time via the input;
update the map resulting in an updated map; and
display the updated map on the display.

20. The system of claim 19, wherein the map further comprises an alert count icon for each of the plurality of assets that have a plurality of active alerts, the alert count icon visually identifying a count of the active alerts for the corresponding asset, each of the alert count icons positioned at a location on the map representation to visually associate the corresponding alert count icon with the corresponding asset.

* * * * *